UNITED STATES PATENT OFFICE.

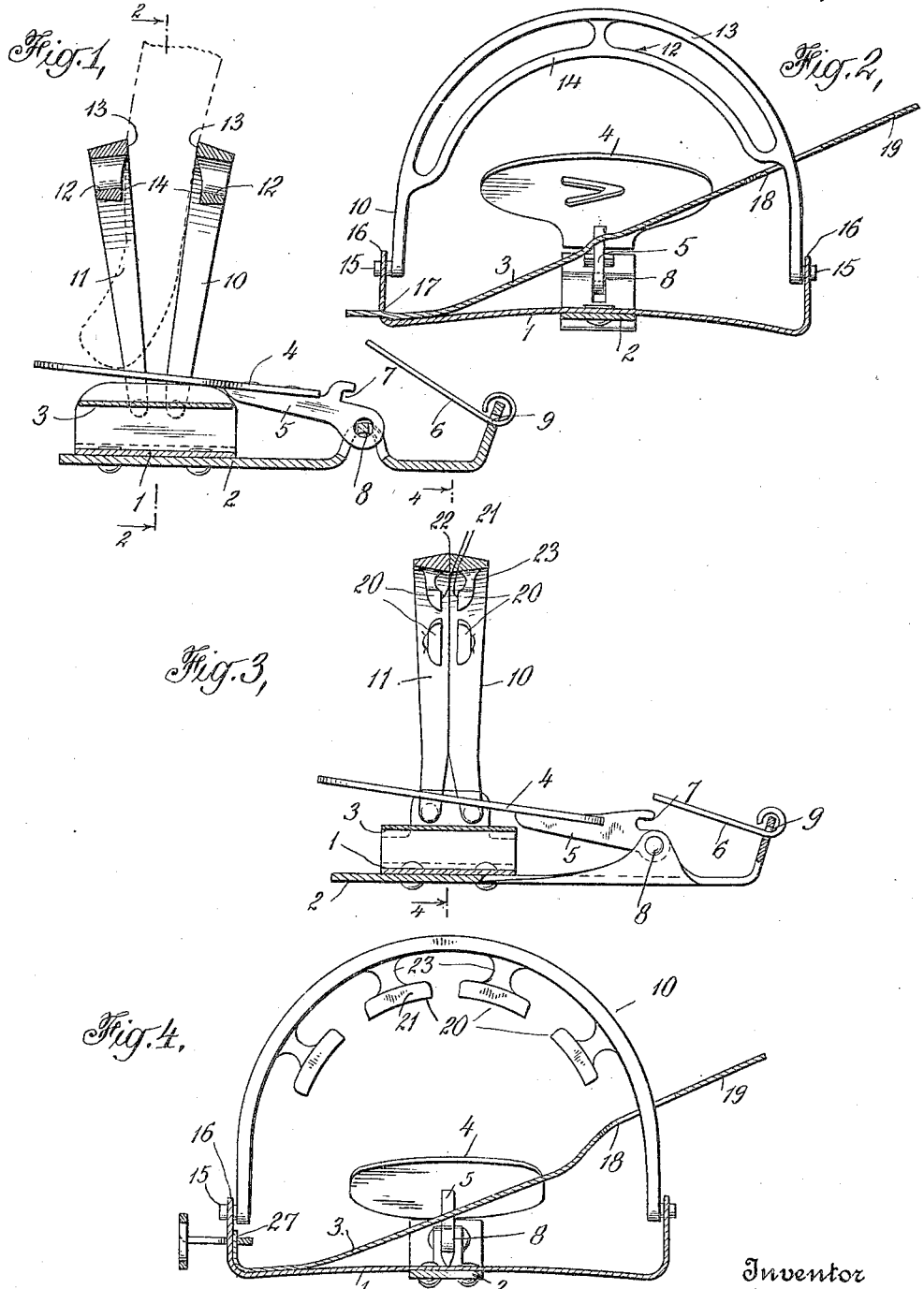

ALLEN McMULLEN, OF KENWOOD, NEW YORK, ASSIGNOR TO ONEIDA COMMUNITY, LIMITED, OF ONEIDA, NEW YORK, A CORPORATION OF NEW YORK.

JAW-TRAP.

1,390,210.        Specification of Letters Patent.     Patented Sept. 6, 1921.

Application filed October 22, 1919. Serial No. 332,478.

*To all whom it may concern:*

Be it known that I, ALLEN MCMULLEN, a British subject, now residing at Kenwood, Madison county, State of New York, have made a certain new and useful Invention Relating to Jaw-Traps, of which the following is a specification, taken in connection with the accompanying drawing, which forms part of the same.

This invention relates especially to jaw traps of the jump trap type and the coöperating jaws, one or more of which may be pivotally connected to the frame of the trap, are provided with secondary trap jaws or jaw members which may be located inside or outside of the main jaws and likewise provided with wide gripping faces to give ample gripping area and which may be either flat or serrated or indented in some cases. These secondary trap jaw members which may be continuous or in the form of separated or sectional secondary jaw members may advantageously be more or less relieved or offset with respect to said main trap jaws so that when the main trap jaws are closed the secondary jaws are still sufficiently open to minimize the substantially normal engagement of the jaws on opposite sides of the animal's leg at separated points along the same which would give a bending impact or blow quite likely to break the leg.

In the accompanying drawing showing in a somewhat diagrammatic way illustrative embodiments of this invention, Figure 1 is a side sectional view of one form of trap.

Fig. 2 is a transverse section thereof taken along the line 2—2 of Fig. 1.

Fig. 3 is a side sectional view through another form of trap; and

Fig. 4 is a transverse sectional view thereof taken substantially along the line 4—4 of Fig. 3.

The jump or other type of trap may as indicated in Fig. 2 have a bottom member or spring 1 with which the jaw spring 3 may coöperate and be sufficiently secured thereto by passing the end of this jaw spring through the aperture 17 in the bottom spring. This bottom spring may have upwardly bent bearing lugs or portions 16 formed with suitable pivot holes to accommodate the pivots 15 on the ends of the trap jaws 10, 11, which may have any suitable shape such as the rounded or substantially semi-circular shape indicated, so that they are closed by the upward movement of the jaw spring formed with a jaw aperture 18 adjacent its free end 19. The setting mechanism which may be of any desired form may as indicated in Fig. 1 comprise the support member 2 riveted or otherwise secured to the bottom spring 1 or other part of the trap frame and formed with an upwardly bent pivot portion 8 to which is pivotally secured the pan lever 5 and attached pan 4. The trigger 6 may have a curved end 9 inclosing the pivotal end of the support member and the free end of this trigger may engage a catch 7 in the pan lever to hold the trap jaws in open set position in the customary way.

The trap jaws which may be of malleable iron or other suitable material preferably have the flat or wide gripping faces 13 to give good gripping action and the secondary trap jaws or jaw members 12 which may be arranged inside the main or primary jaws, if desired, may have similarly extended or wide gripping faces 14. These secondary trap jaw members are preferably relieved or offset to a sufficient extent so that when the main trap jaws, for instance, are in gripping or holding position as indicated in Fig. 1, the gripping faces 14 of the secondary trap jaw members are sufficiently offset to be out of substantial engagement with the animal's leg diagrammatically shown in dotted lines, if it is even approximately normal to the jaw faces. There is correspondingly less danger under these conditions that one of the main trap jaws will engage the animal's leg on one side at the same time that the secondary trap jaw engages the animal's leg with a substantially normal or perpendicular impact on the other side which would be likely to cause a fracture of the leg through the bending impact or blow exerted. The extent to which these secondary jaws are offset or relieved naturally varies with different sized traps, but with small muskrat traps these secondary jaws may be three-sixteenths or a quarter of an inch apart when the main or outer jaws are closed.

Figs. 3 and 4 show another arrangement in which the jaws are similarly pivoted to the bottom spring or member of the trap and are engaged and normally closed by the jaw spring 3 which may have an aperture 18 through which the jaws pass, the other end 27 of this jaw spring being, if desired, bent up around inside of the pivot lug on the bottom spring to be securely held in connection therewith by riveting or clamping. In this case the main or outer jaws 10, 11 are shown as provided with similarly wide substantially rigid gripping faces 22, the secondary jaws being of sectional character and the separated sections 20 of these secondary jaws each being supported by one or more necks 23 which may be cast integral therewith and with the main jaw so as to support the wide gripping faces 21 of these secondary jaws in proper offset position. As indicated in Fig. 3 these secondary jaws are considerably offset or relieved so as to be open to a considerable extent when the main jaws are closed and this relieved offset position of the secondary jaws minimizes leg breakage or release of the animal for the reasons previously indicated.

This invention has been described in connection with a number of illustrative embodiments, forms, parts, proportions, sizes, materials, and methods of connection, operation and use, to the details of which disclosure the invention is not of course to be limited, since what is claimed as new and what is desired to be secured by Letters Patent is set forth in the appended claims.

I claim:—

1. The jump trap comprising a jaw spring, a bottom spring, pivotally connected spring closed rigid trap jaws formed with wide flat gripping faces and connected secondary trap jaw members spaced apart inwardly from the main jaws and having wide flat gripping faces which are considerably offset as compared to the gripping faces of the main trap jaws to minimize injury or escape of an animal, the connections between said trap jaws and said secondary jaw members being offset more than said jaw members.

2. The game trap comprising spring closed rigid trap jaws formed with wide gripping faces and connected sectional secondary trap jaw members spaced apart from the main jaws and having gripping faces which are considerably offset as compared to the gripping faces of the main trap jaws to minimize injury or escape of an animal, the connections between said trap jaws and said secondary jaw members being offset more than said jaw members.

3. The trap comprising spring closed pivotally mounted trap jaws formed with wide gripping faces and rigidly connected secondary trap jaw members spaced apart inwardly from the main jaws and having wide gripping faces which are considerably relieved as compared to the gripping faces of the main trap jaws, the connections between said trap jaws and said secondary jaw members being offset more than said jaw members.

ALLEN McMULLEN.